(12) United States Patent
Chen

(10) Patent No.: US 11,400,473 B2
(45) Date of Patent: Aug. 2, 2022

(54) PLASTIC SPRING, PUMP CORE, LOTION PUMP AND PRESS-TYPE PACKAGING CONTAINER

(71) Applicant: YUYAO CAIYUN COSMETICS PACKAGING CO., LTD., Zhejiang (CN)

(72) Inventor: Jiabin Chen, Zhejiang (CN)

(73) Assignee: YUYAO CAIYUN COSMETICS PACKAGING CO. LTD., Zhejiang (CN)

( * ) Notice: Subject to any disclaimer, the term of this patent is extended or adjusted under 35 U.S.C. 154(b) by 34 days.

(21) Appl. No.: 17/149,447

(22) Filed: Jan. 14, 2021

(65) Prior Publication Data
US 2022/0193707 A1  Jun. 23, 2022

Related U.S. Application Data

(63) Continuation of application No. PCT/CN2020/137233, filed on Dec. 17, 2020.

(51) Int. Cl.
*F16F 3/04* (2006.01)
*B05B 11/00* (2006.01)
*F16F 1/02* (2006.01)

(52) U.S. Cl.
CPC ...... *B05B 11/3077* (2013.01); *B05B 11/3023* (2013.01); *B05B 11/3074* (2013.01); *F16F 1/025* (2013.01)

(58) Field of Classification Search
CPC ........... A47C 3/16; A47C 23/002; F16F 3/023
USPC ... 267/80, 81, 85–88, 91–93, 103, 107, 109, 267/154–157, 164, 166, 174, 175, 177, 267/179
See application file for complete search history.

(56) References Cited

U.S. PATENT DOCUMENTS

| | | | |
|---|---|---|---|
| 3,272,492 A * | 9/1966 | Jones | B60G 11/187 267/154 |
| 5,632,473 A * | 5/1997 | Dias Magalhaes Queiroz | A47C 23/002 267/103 |
| 6,193,225 B1 * | 2/2001 | Watanabe | F16F 1/043 267/167 |
| 6,273,563 B1 | 8/2001 | Volker | |
| 6,484,765 B1 * | 11/2002 | Clemmons | B67D 7/362 141/291 |
| 7,063,388 B2 * | 6/2006 | Chen | A47C 3/16 297/451.7 |

(Continued)

FOREIGN PATENT DOCUMENTS

DE  102019132345 A1  7/2020

*Primary Examiner* — Christopher P Schwartz
(74) *Attorney, Agent, or Firm* — Muncy, Geissler, Olds & Lowe, P.C.

(57) ABSTRACT

A plastic spring, a pump core, a lotion pump and a press-type packaging container. The plastic spring includes at least one spring unit. Each spring unit includes a first support member, a second support member, and at least two torsion arms. The at least two torsion arms are arranged between the first support member and the second support member, and both ends of each of the torsion arms are respectively connected with the first support member and the second support member. Each of the torsion arms includes at least one vertical section, and an end of each vertical section is connected with the first support member or the second support member.

14 Claims, 15 Drawing Sheets

(56) References Cited

U.S. PATENT DOCUMENTS

| | | | | |
|---|---|---|---|---|
| 7,950,634 B2* | 5/2011 | Koehler | ............... | F16F 1/025 |
| | | | | 267/182 |
| 8,939,438 B2* | 1/2015 | Kempf | ............... | F16F 1/047 |
| | | | | 267/166 |
| 10,677,307 B2* | 6/2020 | Aagaard | ............... | F16F 3/023 |
| 2012/0200018 A1* | 8/2012 | Paz | ............... | A47C 23/002 |
| | | | | 267/94 |

* cited by examiner

PLASTIC SPRING, PUMP CORE, LOTION PUMP AND PRESS-TYPE PACKAGING CONTAINER

TECHNICAL FIELD

The disclosure relates to a technical field of packaging, in particular to a plastic spring, a pump core, a lotion pump and a press-type packaging container.

BACKGROUND ART

In the packaging field, in order to pump out liquid, lotion, solid or semi-solid fluid provided in the packaging tank, it is often necessary to use a spring that provides an elastic force. With pressing and resilience of the spring, a pump core assembly of the packaging tank moves up and down, thus pumping out the fluid. There are some other packaging containers that also need to use the spring. For example, the spring is often used in surprise gift packaging boxes to eject contents, such as in a pressing spring type lipstick tube, a press-type rotating cap and others.

Existing springs are all made of stainless steel, ferroalloy, or other metal materials or metal alloy materials. Therefore, once the spring comes into contact with the contents in the packaging tank, it is very easy to pollute these contents and affect quality of products. Especially in packaging fields of cosmetics, daily necessities, medicines, foods and other products, which have high requirements on product purity, once the products are contaminated, harm may be caused to human body. Furthermore, using of metal parts is unfavourable for recycling and cannot meet increasing environmental protection requirements.

There are also some existing technologies that try to replace metal springs with all-plastic ones which are very easy to break due to their own properties.

SUMMARY

The disclosure aims to provide a plastic spring, a pump core, a lotion pump and a press-type packaging container which are not made of any metal material or alloy material and are not easy to break.

In order to solve the above technical problems, the present disclosure provides a plastic spring which includes at least one spring unit. Each spring unit includes a first support member, a second support member, and at least two torsion arms. The at least two torsion arms are arranged between the first support member and the second support member, and both ends of each of the torsion arms are respectively connected with the first support member and the second support member. Each of the torsion arms includes at least one vertical section, and an end of each vertical section is connected with the first support member or the second support member.

When there is only one spring unit in the plastic spring of the present disclosure, the first and second support members of the spring unit respectively serve as two parts bearing a pressing force of the spring. The first and second support members conduct the pressing force to at least two torsion arms arranged between the first and second support members, and then the at least two torsion arms deform to generate resilience which then acts on an acted surface via the first and second support members. Each of the torsion arms in the disclosure includes at least one vertical section. Provision of the vertical sections can help to conduct the pressing force or resilience, and when the pressing force or resilience is conducted to the torsion arms or the first and second support members through the vertical sections, it can effectively prevent joints between the torsion arms and the first and second support members from breaking.

When the plastic spring includes two or more spring units, different spring units are connected through a first mating surface of one spring unit and a second mating surface of another spring unit. Different spring units are connected integrally or separately. In order to maintain an effective conduction of an acting force, a total thickness of connected support members from different spring units can be equal to or smaller than a thickness of the support members which need to be directly associated with the acted surface. Different spring units can be of a same shape and size or of different shapes and sizes.

The vertical sections in adjacent spring units correspond to each other in position. Directions of the torsion arms in adjacent spring units can be the same or different, which, for example, can both extend clockwise or counterclockwise, or one can extend clockwise and the other counterclockwise. Adjacent spring units can also be axisymmetric.

Optionally, when each of the torsion arms includes only one vertical section, the vertical sections of all of the torsion arms can be connected with the same first support member or second support member. That is, all vertical sections are arranged on a same side; or the vertical sections of all of the torsion arms can also be arranged on different sides, that is, some vertical sections are connected with the first support member and some vertical sections are connected with the second support member, preferably, the number of the vertical sections connected with the first support member is equal to that of the vertical sections connected with the second support member, and positions of the vertical sections connected with the first support members are symmetrical with those of the vertical sections connected with the second support members, so that the arranged vertical sections are symmetrical vertically, which facilitates being applied force uniformly.

Optionally, each of the torsion arms includes two vertical sections and a connecting section connecting with the two vertical sections. The vertical sections and the connecting section can be directly connected or can be connected through an arc section. Two ends of the connecting section are respectively connected with the first support member or the second support member through a vertical section. That is to say, the pressing force or the resilience loading on or given by both ends of each of the torsion arms is conducted through a vertical section, which effectively prevents the joints between both ends of the torsion arm and the first and second support members from breaking. In another alternative embodiment, two vertical sections can be directly connected by two arc sections tangent with each other, that is, the connecting section is completely replaced by an arc section.

Optionally, the first support member has a first mating surface and the second support member has a second mating surface. The vertical section connected with the first support member is perpendicular to the first mating surface, while the vertical section connected with the second support member is perpendicular to the second mating surface. In order to be applied for most application scenarios, the first mating surface is parallel to the second mating surface, but the first mating surface may not be parallel to the second mating surface. When the first mating surface is not parallel to the second mating surface, height(s) of one or several torsion arms can be shorter than height(s) of another or several other torsion arms so as to compensate for an imbalance caused by the first mating surface being not parallel to the second mating surface. Therefore, the first mating surface of the first support member and the second mating surface of the second support member severs as the two ends bears the pressing force of the spring. The first mating surface and the second mating surface respectively conduct the pressure applied thereon to the at least two torsion arms arranged between the first and second support members via the first and second support members, and then the at least two torsion arms deform to generate resilience, which is conducted to the first and second mating surfaces via the first and second support members and then acts on the acted surface.

Optionally, a shape of a cross section of each of the torsion arms is any one of a polygon, a circle, an ellipse, a closed figure enclosed by one or more arcs and one or more straight lines, or a closed figure enclosed by multiple arcs. Optionally, each of cross sections of one vertical sections is the same in shape, and each of cross sections of one connecting sections is the same in shape.

Optionally, outer side surfaces of all of the torsion arms define a first surface, and inner side surfaces of all of the torsion arms define a second surface. Further, outer side surfaces of the first support member and the second support member are in the first surface, and inner side surfaces of the first support member and the second support member are in the second surface. That is, an inner side surface of the whole plastic spring defines a first surface, and an outer side surface of the whole plastic spring defines a second surface. In an implementation, the inner side surfaces of the first support member and the second support member are in the second surface, but the outer side surfaces of the first support member and the second support member are not in the first surface. In another implementation, the inner side surface of the first support member and the inner side surface of the second support member are not in the second surface.

The first surface or the second surface may be a surface of revolution, or may be composed of plane connected with each other in sequence. A shape of the first surface may be the same as or different from that of the second surface. The shapes of the first surface and the second surface are set according to different usage scenarios. When the first surface or the second surface is the surface of revolution, the surface of revolution may be an arc surface. More specifically, the surface of revolution may be a cylindrical surface, a conical surface, an elliptical cylinder surface, an elliptical conical surface, a hyperbolic paraboloid, a tapered surface, a column surface, and the like. When the first surface and the second surface are composed of surfaces connected with each other in sequence, they may be prism side surface, pyramid side surface, and the like. Correspondingly, the shapes and sizes of the first support member and the second support member are matched with those of the first surface and the second surface. The first support member and the second support member may be of a circular column, a hollow cone, or a hollow polygon in shape. The first support member may be same as the second support member in shape and size. For example, when both the first surface and the second surface are the cylindrical surfaces, both the first support member and the second support member are of circular columns in shape, and the cylindrical first surface encloses a cylindrical inner cavity, while the cylindrical second surface defines a cylindrical outer surface. The cylindrical inner cavity and the outer surface are smooth surfaces, which will not be stuck with other elements in an operating environment during deformation of the spring. The first support member and the second support member may be different in shape and size. For example, the first support member and the second support member may be of circular columns in shape with different sizes.

Optionally, a side surface of each of the vertical sections further includes a first inclined surface and a second inclined surface which are opposite to each other, and the first inclined surface of one vertical section and the second inclined surface of the other vertical section in the same torsion arm are located in a same inclined side surface. The first inclined surface, an outer side surface of the vertical section, the second inclined surface and an inner side surface of the vertical section are sequentially connected directly or through a transitional arc surface. In an alternative embodiment, the first inclined surface is directly connected with the inner side surface of the vertical section, the inner side surface of the vertical section is directly connected with the second inclined surface, the outer side surface of the vertical section is directly connected with the first inclined surface, and the outer side surface of the vertical section is connected with the second inclined surface through the transitional arc surface.

Optionally, the first inclined surface is parallel to the second inclined surface, so as to keep consistency of the thicknesses of the vertical sections, thereby ensuring an uniformity of force conduction. In another alternative embodiment, the first inclined surface may not be parallel to the second inclined surface.

Optionally, an angle between the first inclined surface and the inner side surface of the vertical section is a first acute angle, an angle between the second inclined surface and the inner side surface of the vertical section is a first obtuse angle, an angle between the first inclined surface and the outer side surface of the vertical section (i.e. the first surface) is a second obtuse angle, and an angle between the second inclined surface and the outer side surface of the vertical section is a second acute angle. In this way, a contact area between the vertical section and the first support member or the second support member can be increased while keeping the first inclined surface parallel to the second inclined surface. Optionally, the first acute angle is smaller than the second acute angle, and the first obtuse angle is equal to the second obtuse angle.

Optionally, the vertical section connected with the second support member also includes a third inclined surface which is connected with the first surface and the second inclined surface respectively. An included angle between the third inclined surface and the outer side surface of the vertical section is a third obtuse angle. A height of the third inclined surface is smaller than that of the first inclined surface. In a general application scenario, the first support member and the second support member are generally located at an upper end and a lower end of a gravity line respectively. The second support member not only needs to bear the pressing force, but also needs to bear a weight of the spring itself. Provision of the third inclined surface adds an additional support surface perpendicular to the second mating surface which increases its bearing capacity. Optionally, the third obtuse angle may be equal to the second obtuse angle.

Optionally, the at least two torsion arms are rotationally symmetrical relative to a rotation axis of the first surface or a rotation axis of the second surface, so as to ensure the uniformity of force conduction.

Optionally, the side surface of each of the torsion arms also includes a first inclined side surface and a second inclined side surface, the first inclined side surface and the second inclined side surface are opposite to each other. A first inclined side surface and a second inclined side surface of the vertical section are the first inclined surface and the second inclined surface respectively, that is to say, the first inclined surface is in the first inclined side surface and the second inclined surface is in the second inclined side surface. A connecting line between the first inclined side surface and the inner side surface of the torsion arm is a first connecting line, a connecting line between the second inclined side surface and the outer side surface of the torsion arm is a second connecting line, and an included angle between a part of the first connecting line on the vertical section and a part of the first connecting line on the connecting section is a fourth obtuse angle, an included angle between a part of the second connecting line at the vertical section and a part of the second connecting line at the connecting section is a fifth obtuse angle. The fifth obtuse angle is larger than the fourth obtuse angle. The fourth obtuse angle may be an included angle between the connecting section and the vertical section when they are connected directly, or an included angle between the connecting section and the vertical section when they are connected through an arc section, or an included angle between a tangent at an intersection of the first connecting line with a connecting line of two arc sections and the first connecting line on the vertical section when there is no connecting section, i.e, the two vertical sections can be directly connected through two arc sections tangent with each other. When in use, the vertical section conducts the applied pressing force to an end of the connecting section connected therewith, and the two ends of the connecting section respectively deform under action of the pressing force to generate resilience. The deforming includes any one or more of stretching, compression, shearing, torsion and bending. When the inner side surface and outer side surface of the connecting section are surfaces of revolution, a torsional force is generated at both ends of the connecting section under the action of pressing force respectively.

Optionally, the fourth obtuse angle ranges from 120 to 179 degrees, such as 125 degrees, 130 degrees, 140 degrees, 135 degrees, 145 degrees, 150 degrees, 160 degrees, etc. Preferably, the fourth obtuse angle is greater than 120 degrees and less than 150 degrees, so as to provide a smooth transition for a force conduction between the vertical section and the connecting section and ensure that a break does not occur between the vertical section and the connecting section. The larger a range of the fourth obtuse angle, the higher an efficiency of a conducting of the pressing force.

Optionally, a sum of heights of the vertical sections of each torsion arm accounts for less than ½ of a height of the whole torsion arm, which provides enough space for the deforming of the connecting section. Optionally, when the connecting section is directly connected with the vertical section or the arc section is short and almost negligible, a height of the connecting section of each torsion arm is greater than the sum of the heights of the vertical sections. When the connecting section is directly connected with the vertical section through the arc section and the arc section is long, the sum of the heights of the arc section and the connecting section is greater than the sum of the heights of the vertical sections.

Optionally, the inner side surface of each torsion arm is a circular arc surface with a central angle ranging from 120 degrees to 180 degrees, such as 120 degrees, 130 degrees, 140 degrees, 150 degrees, 160 degrees, 170 degrees, and the like. The central angle corresponding to the inner side surface of each connecting section is smaller than that of the inner side surface of each torsion arm, and the central angle corresponding to the inner side surface of each connecting section ranges from 45 degrees to 90 degrees, such as 50 degrees, 60 degrees, 70 degrees, 80 degrees, etc, which provides enough space for the deforming of the connecting section and ensures that the connecting section can generate enough deformation to output a sufficient resilience. In order to keep a central angle corresponding to an inner side surface of each connecting section within this range, an overall height of the plastic spring needs to be increased as the fourth obtuse angle increases.

Optionally, a first inclined side surface and a second inclined side surface of each connecting section are flat surfaces. In deforming, the first inclined side surface and the second inclined side surface which are flat surfaces can reduce resistance in bending the connecting section to the first inclined side surface or the second inclined side surface, and ensure that the resistance in bending each part of the connecting section to the first inclined side surface or the second inclined side surface is approximately the same.

Optionally, each spring unit further includes at least two reinforcing arms which are arranged between the first support member and the second support member, and each of the reinforcing arms extends from the first support member or the second support member. Provision of the reinforcing arms facilitates increasing an overall bearing capacity of the spring. The number of the reinforcing arms can be even, such as two, four, eight and the like.

The disclosure also provides a pump core which includes a connecting rod and a limiting piece. The limiting piece is matched with the connecting rod to form an accommodating cavity for accommodating any one of the plastic springs described above. The first support member is matched with the connecting rod and the second support member is matched with the limiting piece.

The disclosure also provides a lotion pump which includes the pump core described above and a pump body. The pump core is arranged in the pump body.

The disclosure also provides a press-type packaging container which is provided with an accommodating cavity for accommodating any one of the plastic springs described above. One side of the accommodating cavity is provided with a first matching piece matched with the first support member, and the other side of the accommodating cavity is provided with a second matching piece matched with the second support member.

To sum up, in this disclosure, the first and second support members of the spring unit respectively serves as two ends bearing the pressing force of the spring. The first and second support members conduct the pressing force to at least two torsion arms arranged between the first and second support members, and then the at least two torsion arms deform to generate resilience which then acts on the acted surface via the first and second support members. Each of the torsion arms in the disclosure includes at least one vertical section. Provision of the vertical sections can help to conduct the pressing force or resilience, and when the pressing force or resilience is conducted to the torsion arms or the first and second support members through the vertical sections, it can effectively prevent joints between the torsion arms and the first and second support members from breaking.

DETAILED DESCRIPTION

Figure 1:
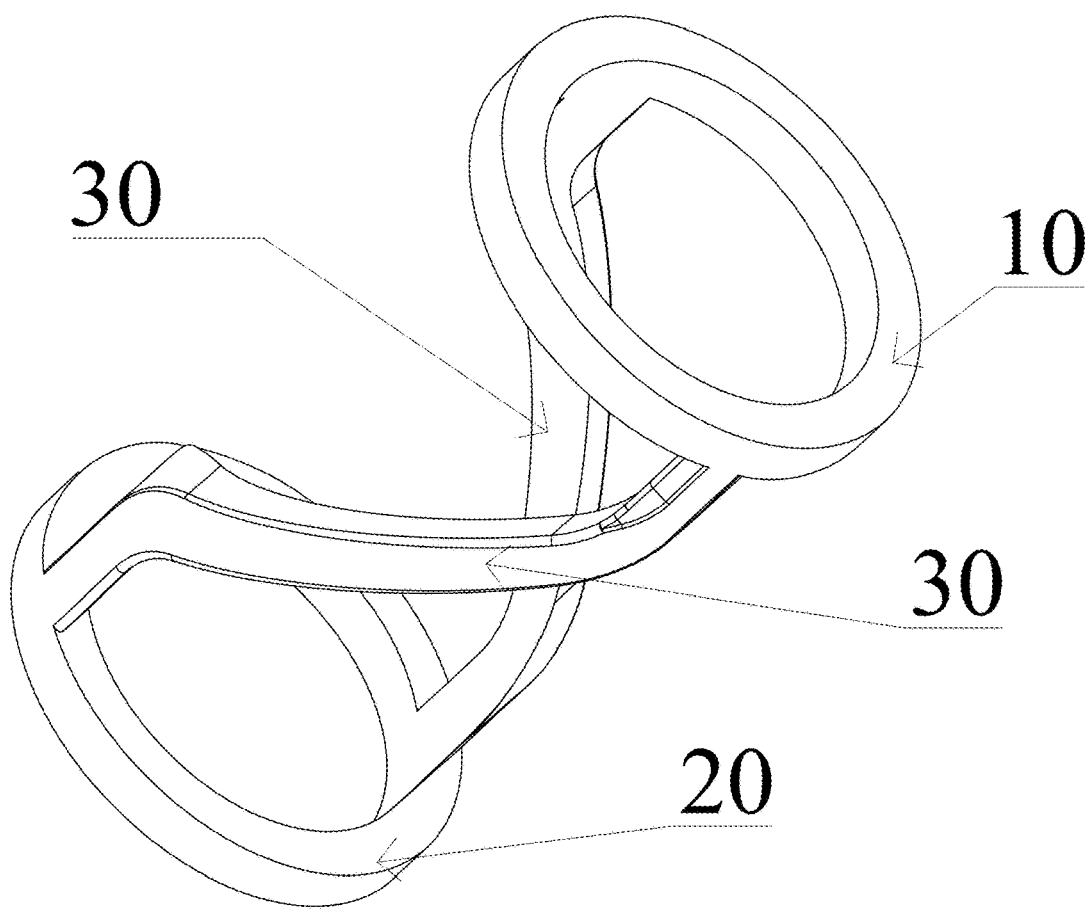
FIG. 1 is a perspective schematic view of a plastic spring according to embodiment 1 of the present disclosure.
Figure 2:
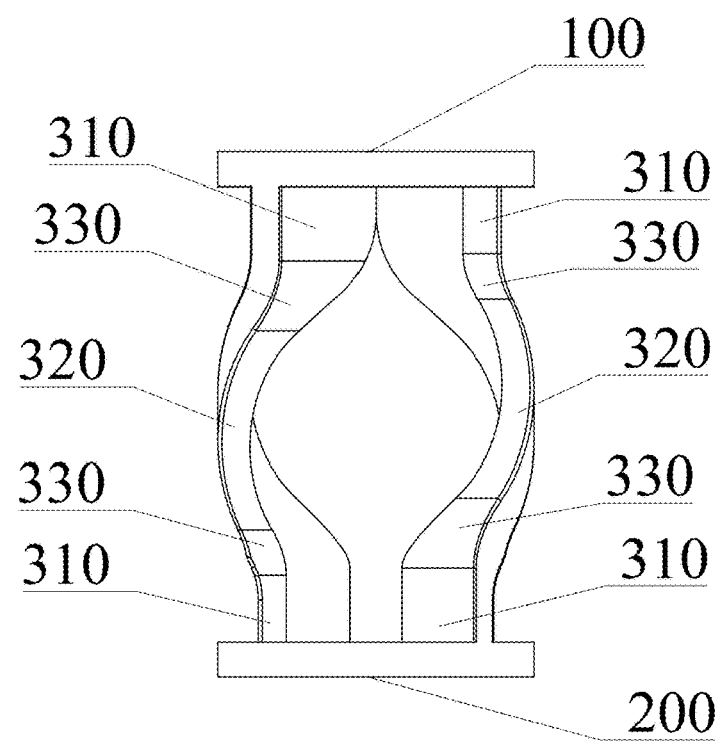
FIG. 2 is a side view of a plastic spring according to embodiment 1 of the present disclosure.

The specific implementations of the present disclosure will be described in further detail with reference to the drawings and embodiments. The following examples serve to illustrate the present disclosure, but are not intended to limit a scope of the present disclosure.

A "vertical" direction of the vertical section in the present disclosure is parallel to a direction of a pressing force or resilience.

In the present disclosure, "and" includes a number involved, for example, "two and more" in the present disclosure includes "two". All ranges in the present disclosure include endpoints.

A height direction in the disclosure is consistent with an axial direction in the disclosure, and is also consistent with a direction of an applied force of the plastic spring. In an embodiment, a height direction is a direction H marked in the drawing.

In the present disclosure, a direction of a total thickness of the support members and a direction of a thickness of the support member are consistent with the axial direction in the present disclosure.

In the present disclosure, a thickness of the vertical section refers to a distance between parallel surfaces of the vertical section, and in the embodiment 1, the thickness of the vertical section is D1 in the figure.

In the present disclosure, a thickness of the connecting section refers to a distance between parallel surfaces of the connecting section, and in the embodiment 1, the thickness of the connecting section is D2 in the figure.

Terms "parallel" and "vertical" in the present disclosure not only refer to strictly "parallel" and "vertical", but also refer to roughly "parallel" and roughly "vertical", that is, errors caused by measurement, design and processing are involved in the protection scope of the present disclosure.

A direction of the cross section in the disclosure is perpendicular to the height direction in the disclosure.

Embodiment 1

Now reference is made to FIGS. 1 to 13. This embodiment provides a plastic spring which includes a spring unit. The spring unit includes a first support member 10, a second support member 20, and at least two torsion arms 30. The first support member 10 includes a first mating surface 100 and the second support member 20 includes a second mating surface 200. The two torsion arms 30 are arranged between the first support member 10 and the second support member 20, and both ends of each of the torsion arms 30 are respectively connected with the first support member 10 and the second support member 20. Each of the torsion arms 30 includes two vertical sections 310, and both ends of the torsion arm 30 are respectively connected with the first support member 10 or the second support member 20 through one vertical section 310.

When there is only one spring unit in the plastic spring of the present disclosure, the first 10 and second 20 support members of the spring unit respectively serve as two parts bearing a pressing force of the spring. Further, the first mating surface 100 of the first support member 10 and the second mating surface 200 of the second support member 20 serve as the two ends bearing the pressing force of the spring. The first mating surface 100 and the second mating surface 200 respectively conduct the pressure applied thereon to the two torsion arms 30 arranged between the first 10 and second 20 support members via the first 10 and second 20 support members, and then the two torsion arms 30 deform to generate resilience, which is conducted to the first 100 and second 200 mating surfaces via the first 10 and second 20 support members and then acts on an acted surface. Each of the torsion arms 30 in this embodiment includes two vertical sections 310. Provision of the vertical sections 310 can help to conduct the pressing force or resilience, and when the pressing force or resilience is conducted to the torsion arms 30 or the first 10 and second 20 support members through the vertical sections 310, it can effectively prevent joints between two ends of each of the torsion arms 30 and the first 10 and second 20 support members from breaking.

In this embodiment, each of the torsion arms 30 also includes a connecting section 320 connecting the two vertical sections 310. In this embodiment, the vertical sections 310 and the connecting section 320 of each of the torsion arms 30 are connected through an arc section 330. If the vertical section 310 and the connecting section 320 are directly connected with each other, processing difficulty is low, but there is a sudden change of direction for an acting force between the vertical section 310 and the connecting section 320 without a smooth transition, and thus it is easy for a break to occur between the vertical section 310 and the connecting section 320. In this embodiment, the vertical section 310 and the connecting section 320 are connected through the arc section 330, which can function to effectively transition the acting force and is not easy to break.

In this embodiment, the vertical section 310 connected with the first support member 10 is perpendicular to the first mating surface 100, while the vertical section 310 connected with the second support member 20 is perpendicular to the second mating surface 200. In order to be applied for most application scenarios, the first mating surface 100 is parallel to the second mating surface 200.

In this embodiment, an outer side surface of the first support member 10, an outer side surface of the second support member 20 and an outer side surface 90 of each of the torsion arms 30 define a first surface 50, and an inner side surface of the first support member 10, an inner side surface of the second support member 20 and an inner side surface 60 of each of the torsion arms 30 define a second surface 40. That is, an inner side surface of the whole plastic spring defines the first surface 50, and an outer side surface of the whole plastic spring defines the second surface 40.

In this embodiment, both the first surface 50 and the second surface 40 are the cylindrical surfaces, and correspondingly, the shapes and sizes of the first support member 10 and the second support member 20 are matched with those of the first surface 50 and the second surface 40. The first support member 10 and the second support member 20 are of circular columns in shape. The first support member 10 may be same as the second support member 20 in shape and size, forming a vertically symmetrical shape, which facilitates a uniform distribution of forces. The cylindrical first surface 50 encloses a cylindrical inner cavity, while the cylindrical second surface 40 defines a cylindrical outer surface. The cylindrical inner cavity and the outer surface are smooth surfaces, which will not be stuck with other elements in an operating environment during deformation of the spring.

In this embodiment, a side surface of each of the torsion arms 30 also includes a first inclined side surface 70 and a second inclined side surface 80. The first inclined side surface and the second inclined side surface on the vertical section 310 are a first inclined surface 311 and a second inclined surface 312 respectively, and the first inclined surface of one vertical section 310 and the second inclined surface of the other vertical section 310 in the same torsion arm 30 are located in a same inclined side surface. The first inclined surface 311 is directly connected with the inner side surface 314 of the vertical section 310, the inner side surface 314 of the vertical section 310 is directly connected with the second inclined surface, the outer side surface 313 of the vertical section 310 is directly connected with the first inclined surface, and the outer side surface of the vertical section 310 is connected with the second inclined surface through the transitional arc surface.

Figure 10:
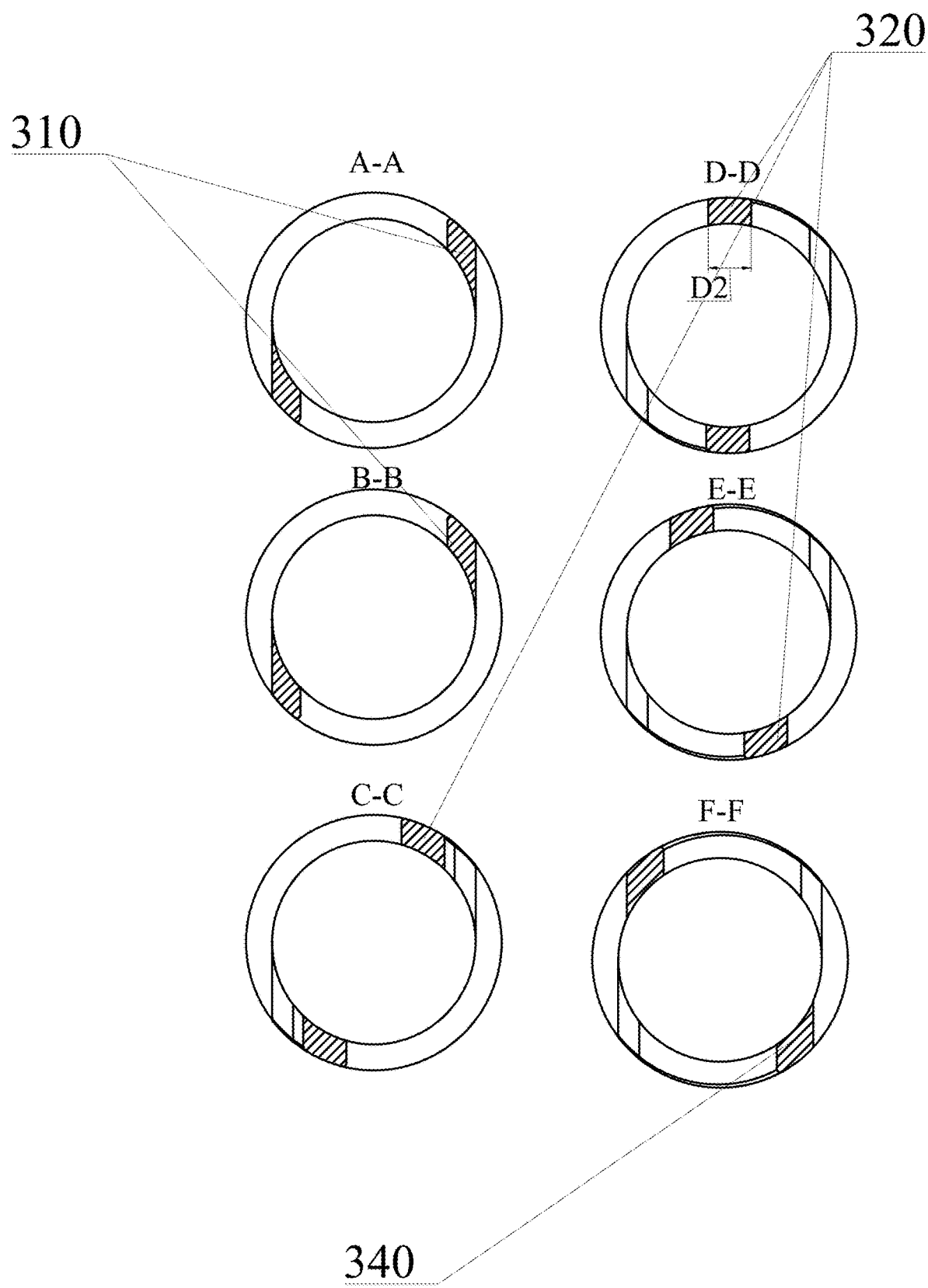
FIG. 10 is a schematic view showing various cross sections in FIG. 9.
Figure 11:
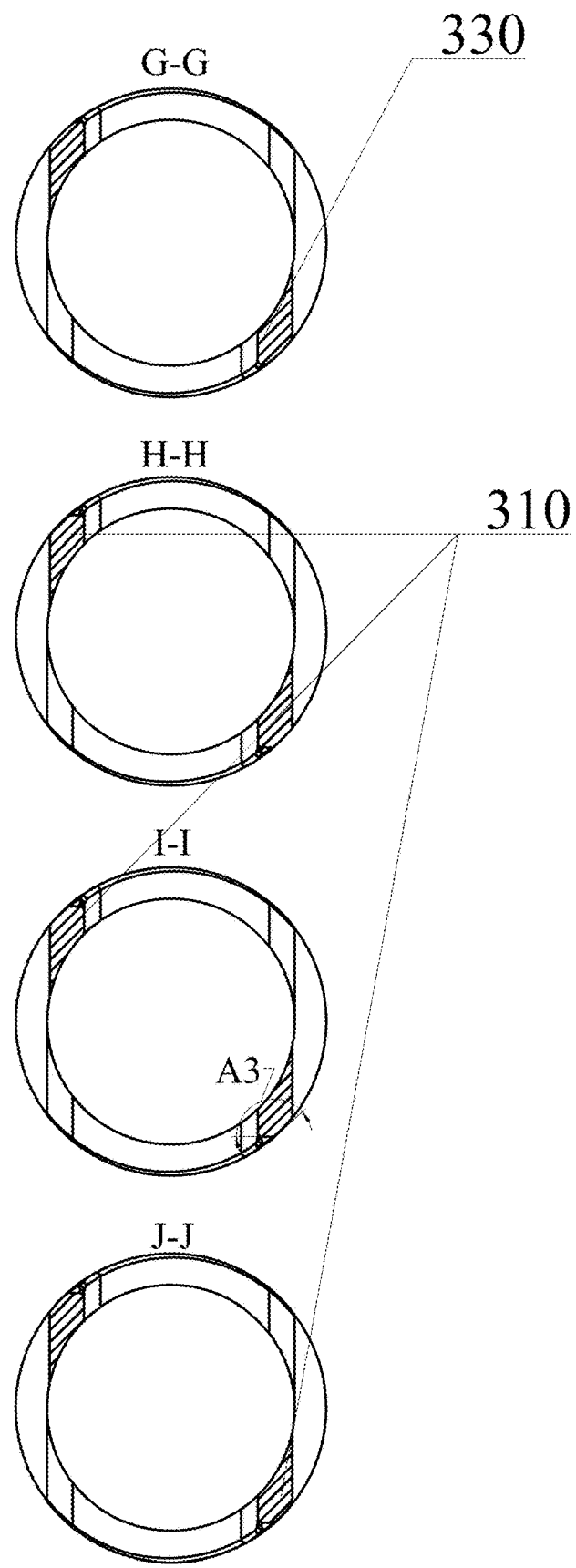
FIG. 11 is another schematic view showing various cross sections in FIG. 9.
Figure 12:
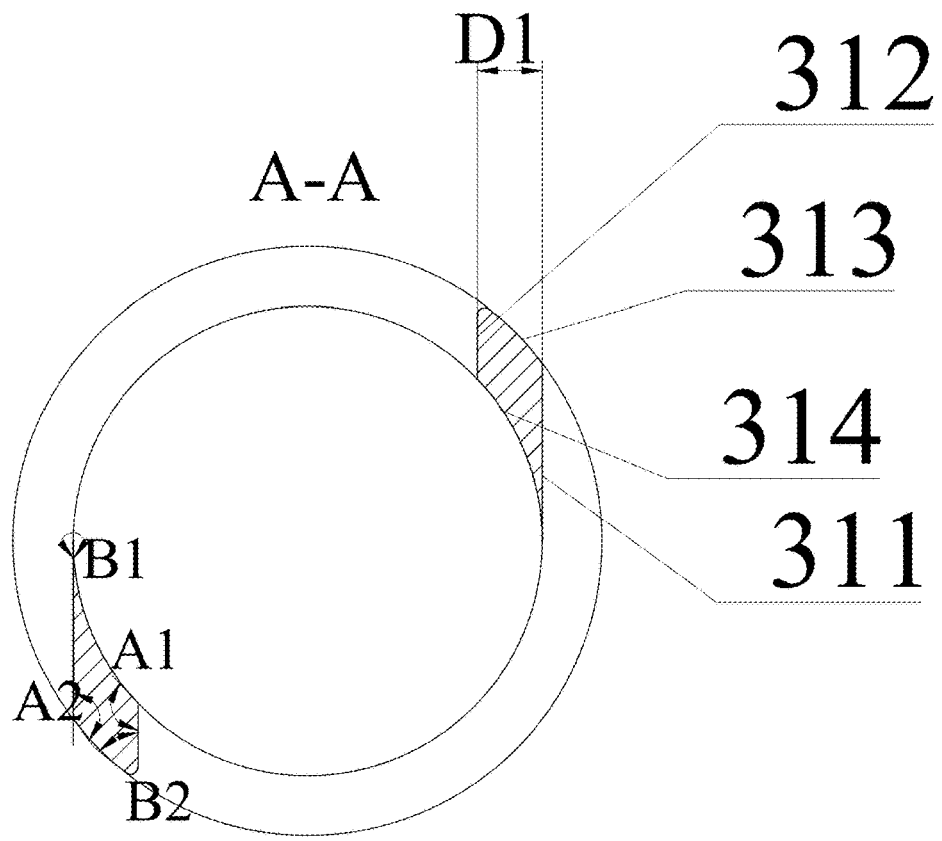
FIG. 12 is an enlarged schematic view of a cross section A-A in FIG. 9.
Figure 13:
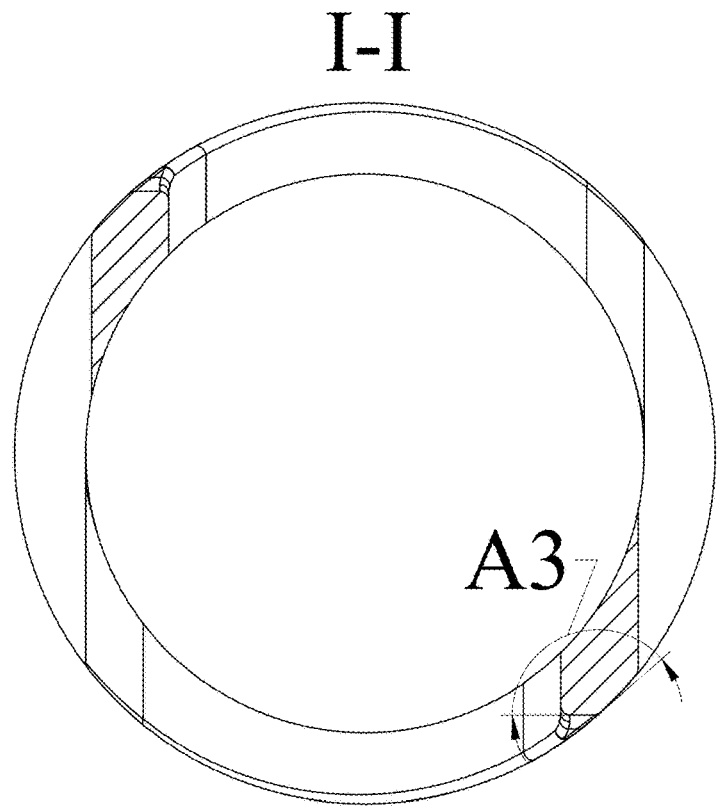
FIG. 13 is an enlarged schematic view of a cross section I-I in FIG. 9.

As shown in FIGS. 10-12, a cross section A-A, a cross section B-B, a cross section H-H, a section I-I and a section J-J are all sections of the vertical section 310 from high to low along the height direction. The cross section A-A and the cross section B-B are cross sections of the vertical section 310 connected with the first support member 10. In this embodiment, an angle between the first inclined surface and the inner side surface 314 of the vertical section 310 is a first acute angle B1, an angle between the second inclined surface and the outer side surface 314 of the vertical section 310 is a first obtuse angle A1, an angle between the first inclined surface and the outer side surface of the vertical section 310 is a second obtuse angle A2, and an angle between the second inclined surface and the outer side surface of the vertical section 310 is a second acute angle B2. In this way, a contact area between the vertical section 310 and the first support member 10 or the second support member 20 can be increased while keeping the first inclined surface parallel to the second inclined surface. In this embodiment, the first acute angle B1 is smaller than the second acute angle B2, and the first obtuse angle A1 is equal to the second obtuse angle A2. The first acute angle B1 is less than 10 degrees, and further less than 5 degrees. In this embodiment, the first acute angle B1 is 2 degrees, and the first acute angle B1 is a sharp angle. The second acute angle B2 ranges from 45 to 70 degrees and in this embodiment the second acute angle B2 is 50 degrees. The second obtuse angle A2 and the first obtuse angle A1 ranges from 120 to 180 degrees, and in this embodiment both the first obtuse angle A1 and the second obtuse angle A2 are 140 degrees.

In the cross-sectional view A-A and the cross-sectional view B-B, the cross sections of the vertical sections 310 are both quadrangles with a pair of parallel sides. The first inclined surface is parallel to the second inclined surface, so as to keep consistency of the thicknesses D1 of the vertical sections 310, thereby ensuring a uniformity of force conduction.

The cross section H-H, the cross section I-I and the cross section J-J are all cross sections of the vertical sections 310 connected with the second support member 20. In the cross-sectional view H-H, cross-sectional view I-I and cross-sectional view J-J, the cross sections of the vertical sections 310 are all pentagonal. In this embodiment, the vertical section 310 connected with the second support member 20 also includes a third inclined surface 315 which is connected with the outer side surface of the vertical section 310 and the second inclined surface respectively. An included angle between the third inclined surface 315 and the outer side surface of the vertical section 310 is a third obtuse angle A3. A height of the third inclined surface 315 is smaller than that of the first inclined surface. In a general application scenario, the first support member 10 and the second support member 20 are generally located at an upper end and a lower end of a gravity line respectively. The second support member 20 not only needs to bear the pressing force, but also needs to bear a weight of the spring itself. Provision of the third inclined surface 315 adds an additional support surface perpendicular to the mating surfaces, which increases its bearing capacity. In this embodiment, the third obtuse angle A3 may be equal to the second obtuse angle A2.

Figure 8:
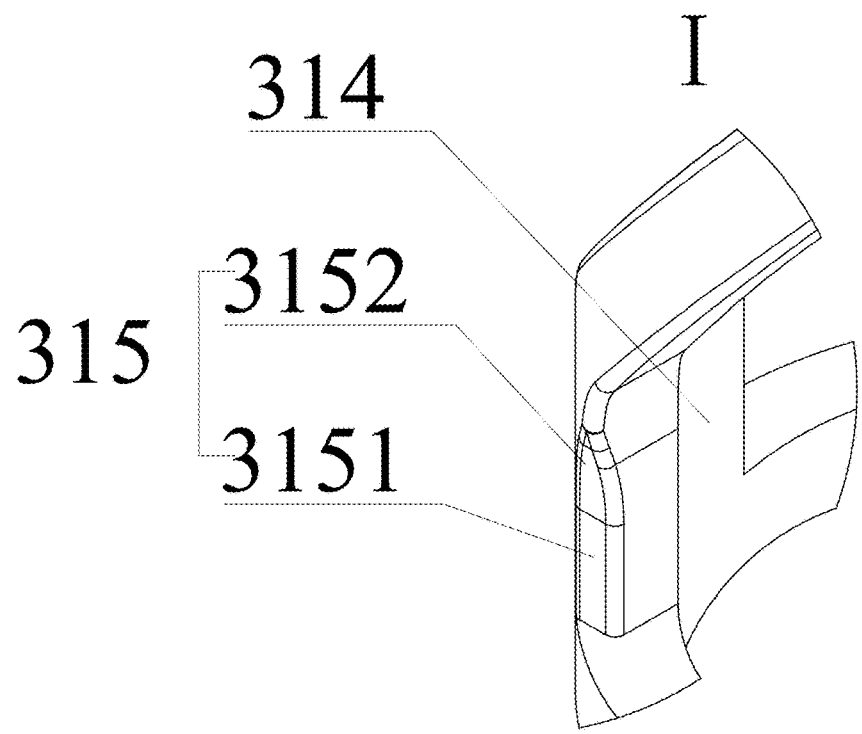
FIG. 8 is an enlarged schematic view of area I in FIG. 7.
Figure 9:
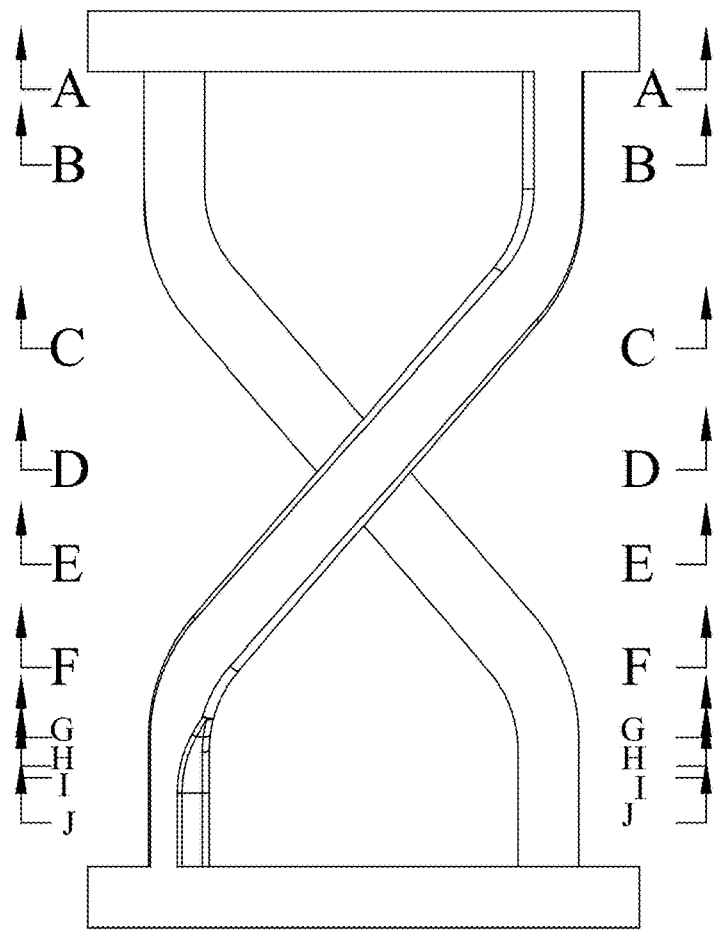
FIG. 9 is a side view in a direction different from that shown in FIG. 2 according to embodiment 1 of the present disclosure.

As shown in FIG. 8, the third inclined surface 315 includes two parts, a quadrilateral first part 3151 completely perpendicular to the first mating surface 100 and a second part 3152 which is triangular when developed on a plane. The second part 3152 is configured for a transition.

In this embodiment, the at least two torsion arms 30 are centrosymmetric relative to a central axis of the first support member 10 so as to ensure the uniformity of force conduction. In this embodiment, the central axis of the first support member 10 is a central axis of the circular column.

Figure 4:
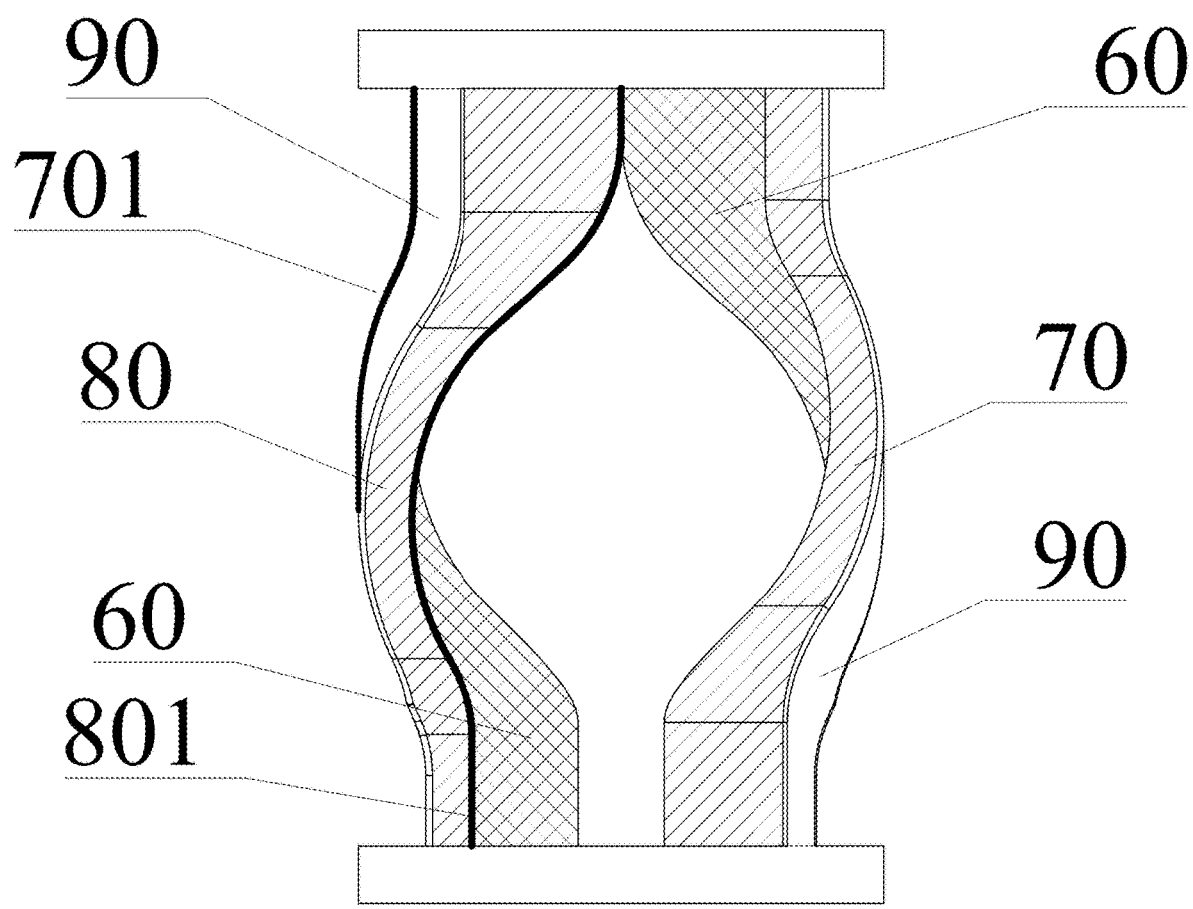
FIG. 4 is a side view showing different side surfaces of the torsion arm according to embodiment 1 of the present disclosure.
Figure 5:
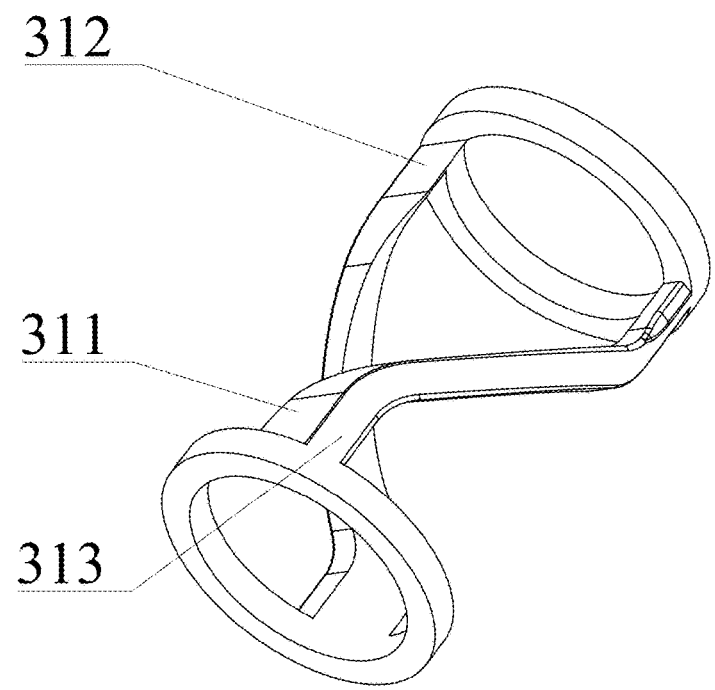
FIG. 5 is another perspective schematic view of a plastic spring according to embodiment 1 of the present disclosure.
Figure 7:
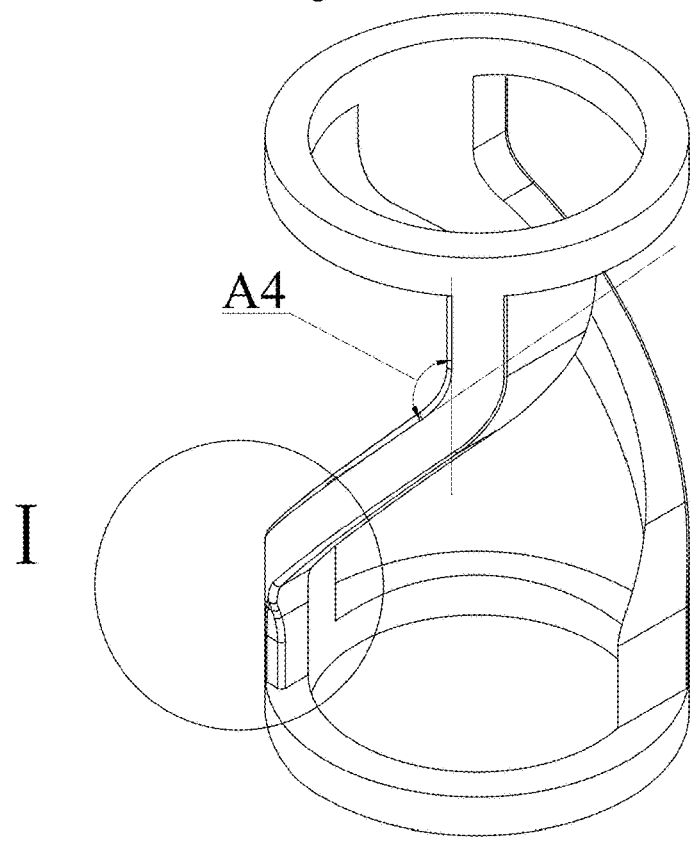
FIG. 7 is a perspective schematic view of a plastic spring showing a fourth obtuse angle according to embodiment 1 of the present disclosure.

As shown in FIGS. 4, 7 and 8, in this embodiment, a connecting line between the first inclined side surface and the inner side surface of the torsion arm 30 is a first connecting line 801, a connecting line between the second inclined side surface and the outer side surface of the torsion arm 30 is a second connecting line 701. The first connecting line 801 and the second connecting line 701 drawn in FIG. 4 are thicker than other lines, which is for ease of distinguishing but not for any limitation. An included angle between a part of the first connecting line at the vertical section 310 and a part of the first connecting line at the connecting section 320 is a fourth obtuse angle A4, an included angle between a part of the second connecting line at the vertical section 310 and a part of the second connecting line at the connecting section 320 is a fifth obtuse angle. The fifth obtuse angle is larger than the fourth obtuse angle. Although part of the second connecting line on the vertical section does not intersect with the part of the second connecting line on the connecting section 320, the fifth obtuse angle and the fourth obtuse angle are on a same plane, the fifth obtuse angle is an angle between part of the second connecting line on the vertical section and the part of the second connecting line on the connecting section in the plane where the fourth obtuse angle is located. When in use, the vertical section 310 conducts the applied pressing force to an end of the connecting section 320 connected therewith, and the two ends of the connecting section 320 respectively deform under action of the pressing force to generate resilience. The deforming includes any one or more of stretching, compression, shearing, torsion and bending. When the inner side surface and outer side surface of the connecting section 320 are surfaces of revolution, a torsional force is generated at both ends of the connecting section 320 under the action of pressing force respectively.

In this embodiment, the fourth obtuse angle A4 is 124 degrees, so as to provide the smooth transition for the force conduction between the vertical section 310 and the connecting section 320, and ensure that a break does not occur between the vertical section 310 and the connecting section 320.

Referring to FIG. 10, the cross sections of the connecting section 320 in this embodiment from high to low in the height direction are shown in the cross-sectional view C-C, the cross-sectional view D-D, and the cross-sectional view E-E. It can be seen that a shape of the cross sections of the connecting section 320 are composed of a pair of parallel line segments connecting with a pair of arcs with a same curvature, which is approximately parallelogram.

Referring to FIGS. 10 and 11, a cross section of each arc section 330 from high to low in the height direction is shown in the cross-sectional view F-F and the cross-sectional view G-G. The cross-sectional view F-F is a cross-sectional view of an interface between the connecting section 320 and the arc section 330.

Figure 6:
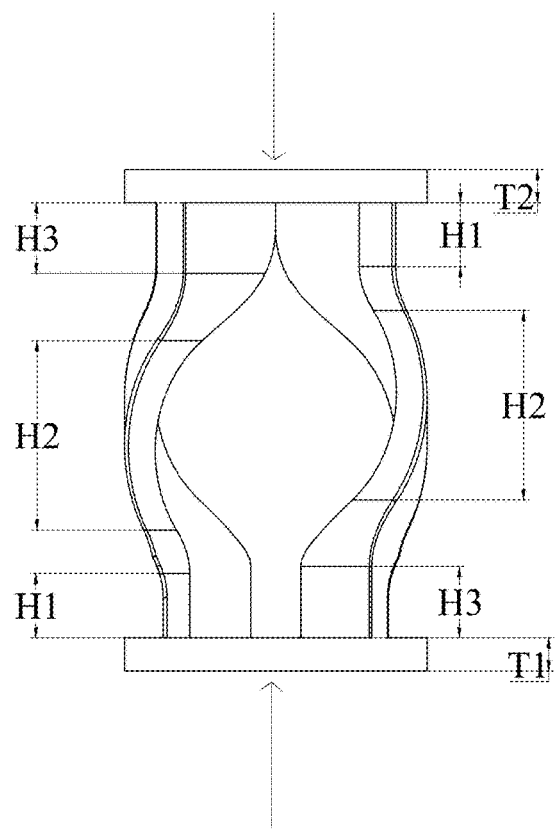
FIG. 6 is a schematic view showing a height of a vertical section, a height of a connecting section and a thickness of the support member according to embodiment 1 of the present disclosure.

It can be seen from FIG. 6 that in this embodiment, a height H2 of the connecting section 320 of each of the torsion arms 30 accounts for 40% of a total height of the torsion arm 30, a total height of the arc section 330 of each of the torsion arms 30 accounts for 30% of the total height of the torsion arm 30, a total height of the vertical section 310 of each of the torsion arms 30 accounts for 30% of the total height of the torsion arm 30. The height H2 of connecting section 320 is greater than a sum of heights of vertical sections 310, which provides enough space for deformation of the connecting sections 320. The vertical sections 310 of each of the torsion arms 30 connected to the different support member have different heights which are H1 and H3, respectively. When the vertical section 310 are connected with the arc section 330, they are connected through an inclined surface. In this embodiment, H3 is used as the height of the vertical section 310, that is, a distance from a highest point to a lowest end of the vertical section 310. In other embodiments, when the vertical section 310 and the arc section 330 are connected, they can also be connected through a surface, where H1=H3.

Figure 3:
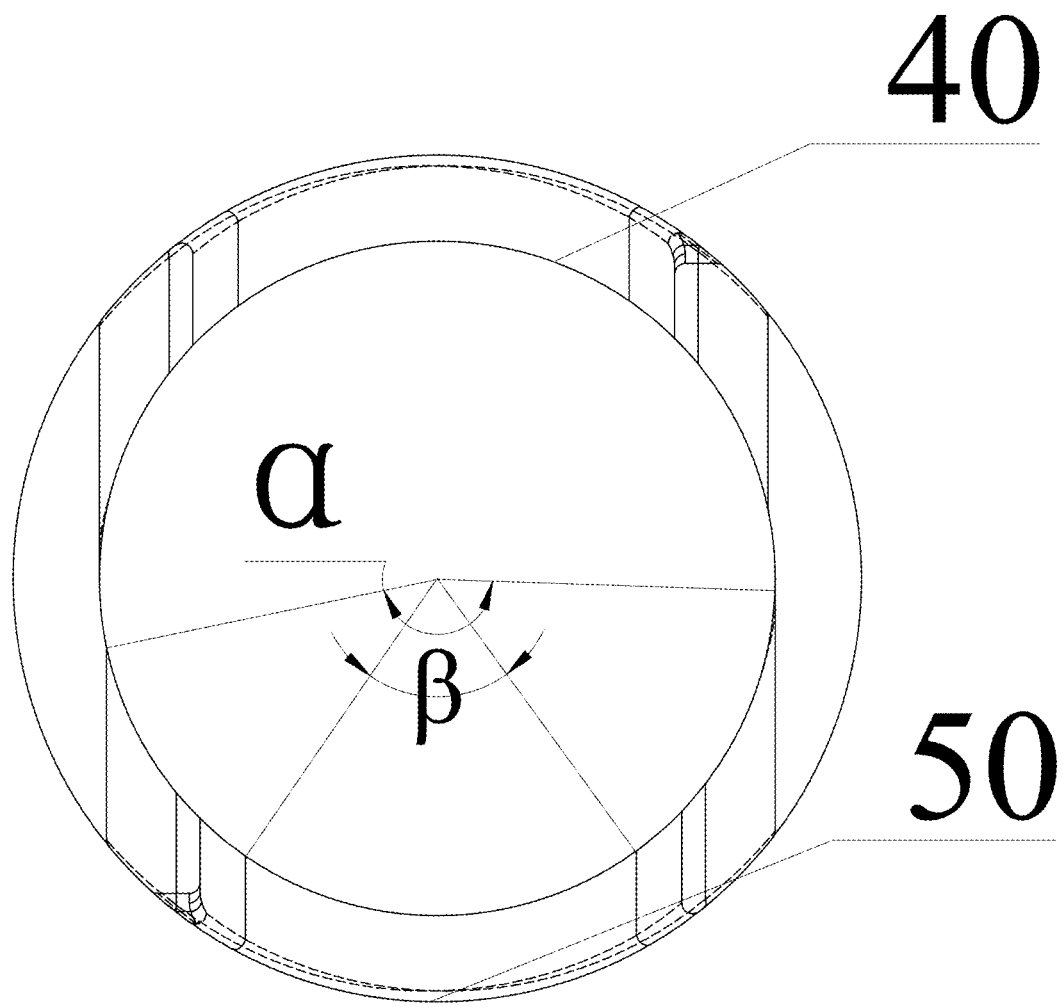
FIG. 3 is a top view of a plastic spring according to embodiment 1 of the present disclosure.

As shown in FIG. 3, in this embodiment, the inner side surface of each torsion arm 30 is a circular arc surface with a central angle α of 165 degrees. The central angle corresponding to the inner side surface of each connecting section 320 is smaller than that of the inner side surface of each torsion arm 30, and the central angle β corresponding to the inner side surface of each connecting section 320 is 70 degrees, which provides enough space for the deforming of the connecting section 320 and ensures that the connecting section 320 can generate enough deformation to output a sufficient resilience.

In this embodiment, the first inclined side surface and the second inclined side surface of each connecting section 320 are flat surfaces. In deforming, the first inclined side surface and the second inclined side surface which are flat surfaces can reduce resistance in bending the connecting section 320 to the first inclined side surface or the second inclined side surface, and ensure that the resistance in bending each part of the connecting section 320 to the first inclined side surface or the second inclined side surface is approximately the same.

Embodiment 2

Figure 14:
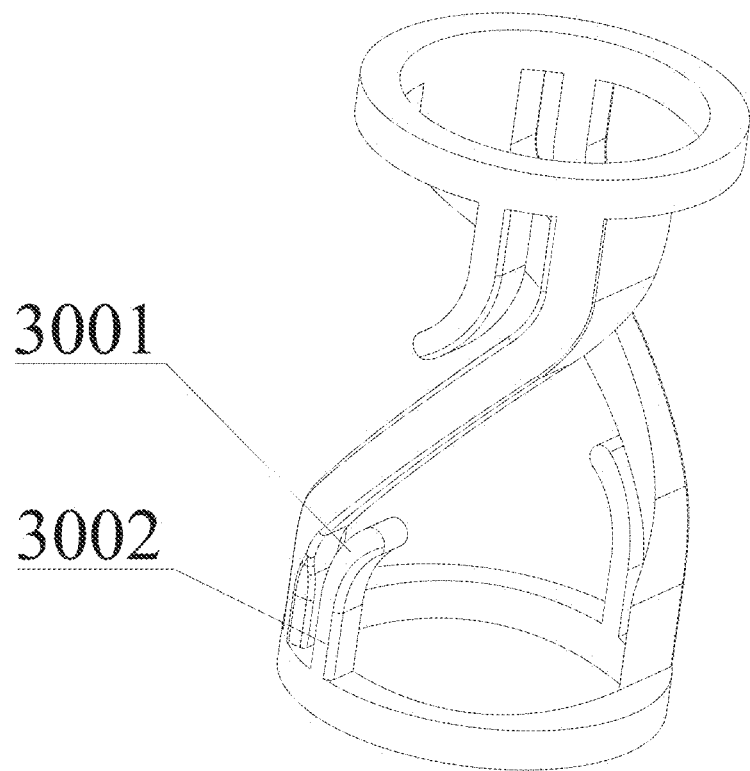
FIG. 14 is a perspective schematic view of a plastic spring provided with a reinforcing arm according to embodiment 2 of the present disclosure.
Figure 15:
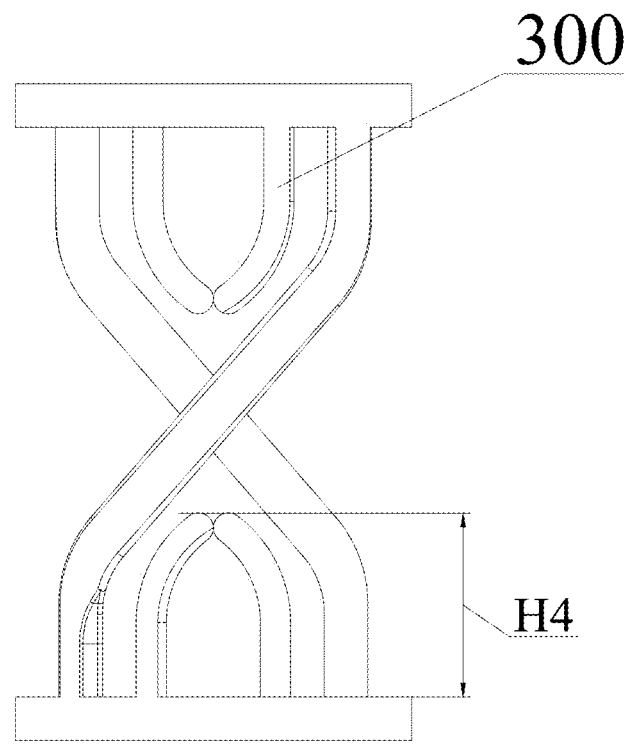
FIG. 15 is a side view of a plastic spring provided with a reinforcing arm according to embodiment 2 of the present disclosure.

Now reference is made to FIGS. 14 to 15. In order to improve the bearing capacity of the spring, a reinforcing arm 300 is added to the plastic spring of Embodiment 2 on the basis of Embodiment 1.

Each spring unit also includes two pairs of reinforcing arms 300, i.e., four reinforcing arms 300, all of which are arranged between the first support member and the second support member, and each reinforcing arm extends from the first support member or the second support member. Provision of the reinforcing arms facilitates increasing an overall bearing capacity of the spring. All reinforcing arms are centrosymmetric relative to the central axis of the plastic spring.

Each reinforcing arm also includes a vertical section 3001 and a curved section 3002 connected to an end of the vertical section. The vertical section and the curved section of the reinforcing arm are parallel to the vertical section and the arc section of the torsion arm respectively. The shapes of the vertical section and curved section of the reinforcing arm are similar to those of the vertical section and the arc section of the torsion arm respectively. All of these sections are all formed by connecting four surfaces in turn with a difference that a shape of a cross section of the vertical section of the reinforcing arm is composed of a pair of parallel line segments and a pair of arcs with a same curvature, which is approximately parallelogram. And the vertical section of the reinforcing arm may not be provided with a third inclined surface. An end of the reinforcing arm away from the curved section of the vertical section is rounded, and the reinforcing arm is arranged close to the torsion arm.

A height H4 of each reinforcing arm is less than half of a height of the whole torsion arm, and the height of each reinforcing arm is greater than 25% of the height of the whole torsion arm. In this embodiment, the height of each reinforcing arm accounts for 30% of the height of the whole torsion arm.

Embodiment 3

Figure 16:
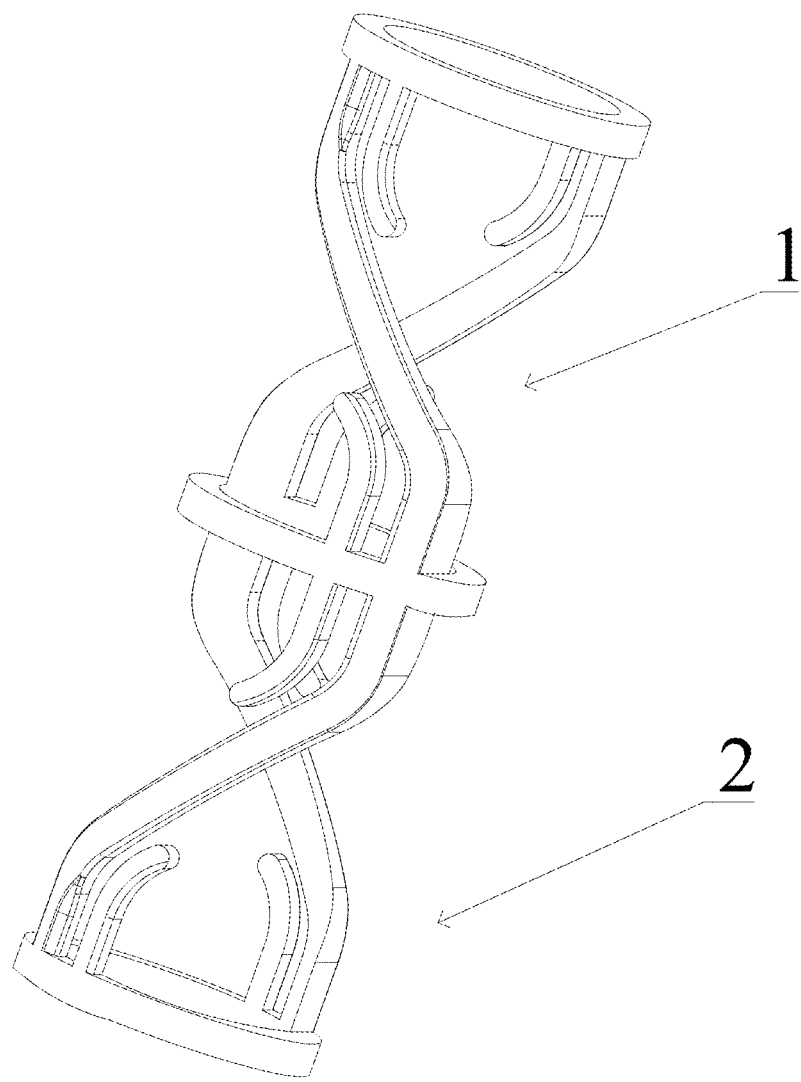
FIG. 16 is a perspective schematic view of a plastic spring with two spring units according to embodiment 2 of the present disclosure.
Figure 17:
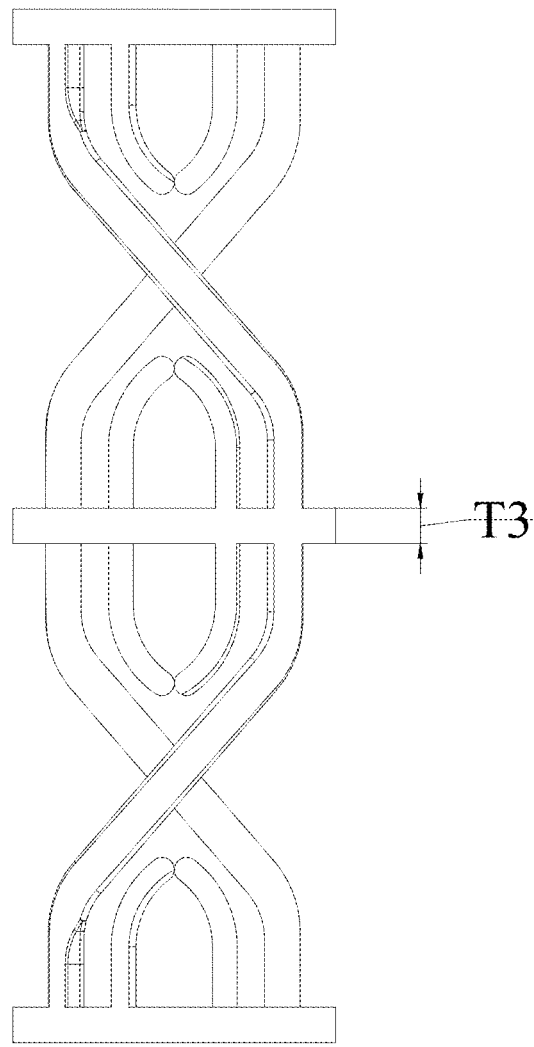
FIG. 17 is a schematic side view of a plastic spring with two spring units according to embodiment 3 of the present disclosure.

Now reference is made to FIGS. 16 to 17. This embodiment provides a plastic spring with two spring units, and a shape of each of the spring units is the same as that of the spring unit in embodiment 2. Different spring units are connected through a first mating surface of one spring unit 1 and a second mating surface of the other spring unit 2. Different spring units are connected integrally. In order to maintain an effective conduction of an acting force, a total thickness T3 of the support members after different spring units are connected is equal to a thickness T1 or T2 of the support member that need to be directly associated with the acted surface. T1 is equal to T2. In other embodiments, different spring units may have different shapes and sizes.

The reinforcing arms and vertical sections between adjacent spring units are opposite one by one, and the adjacent spring units are axisymmetric.

Embodiment 4

Figure 18:
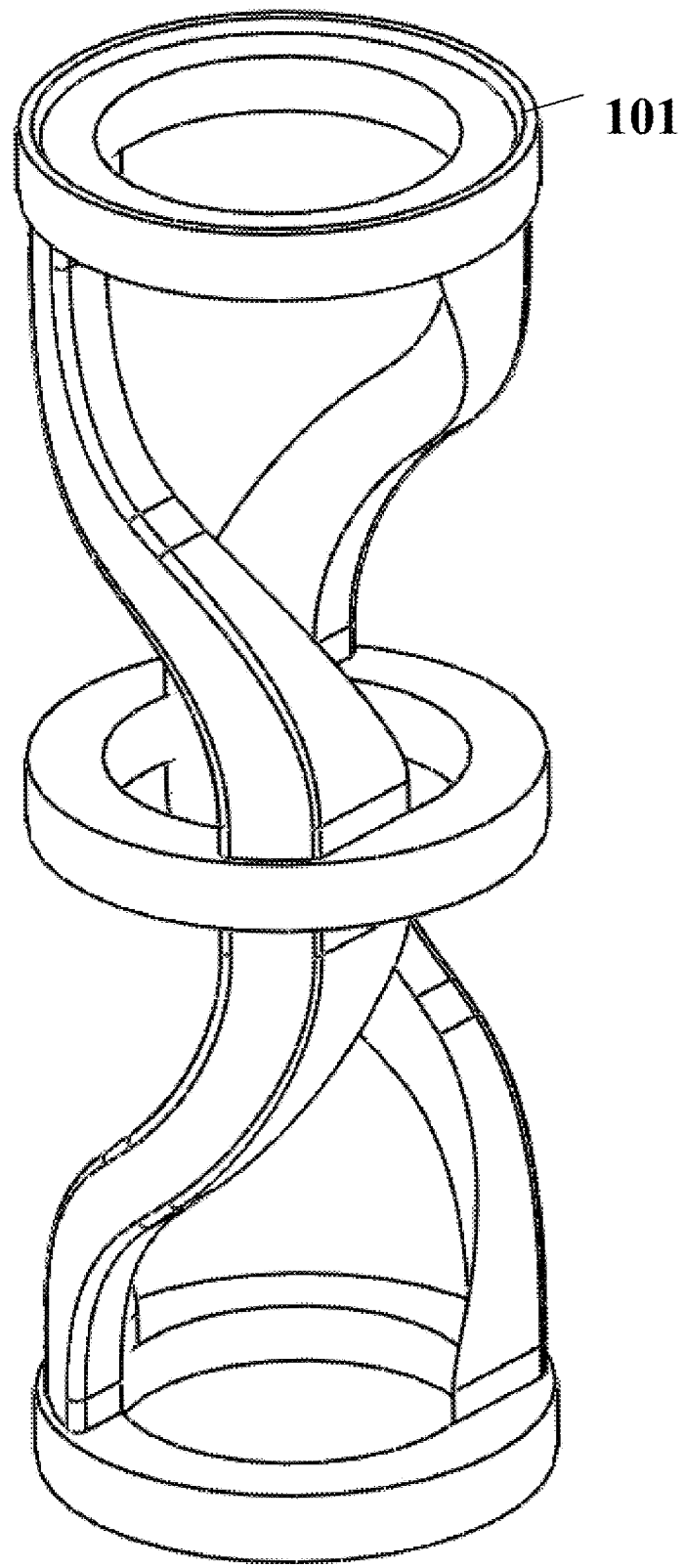
FIG. 18 is a perspective schematic view of a plastic spring with two spring units according to embodiment 4 of the present disclosure.

Referring to FIG. 18, this embodiment provides a plastic spring with two spring units, and a shape of each of the spring units is substantially the same as that of the spring unit in embodiment 1, and difference will be explained below.

In this embodiment, a restriction ring 101 is provided around the first mating surface of the first support member, and a retaining ring is also provided around the second mating surface of the second support member. The inner side surfaces of the first support member and the second support member are in the second surface, but the outer side surfaces of the first support member and the second support member are not in the first surface.

In this embodiment, the connecting section and vertical section are connected through the arc section which accounts for a large proportion. In this embodiment, a sum of the heights of the arc section and the connecting section is much larger than a sum of the heights of the vertical sections. The sum of the heights of the arc section and the connecting section accounts for 89% of the height of the torsion arm and the height of the connecting section accounts for 6% of the height of the torsion arm.

The spring unit in this embodiment is not provided with the third inclined surface.

Embodiment 5

Figure 19:
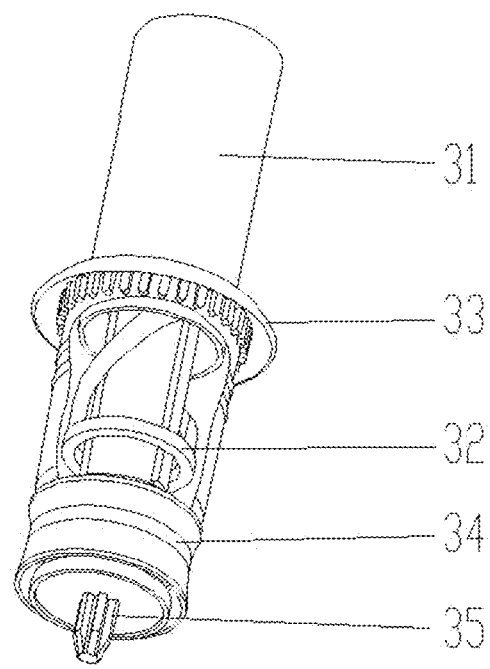
FIG. 19 is a partial sectional view of a pump core according to embodiment 5 of the present disclosure.
Figure 20:
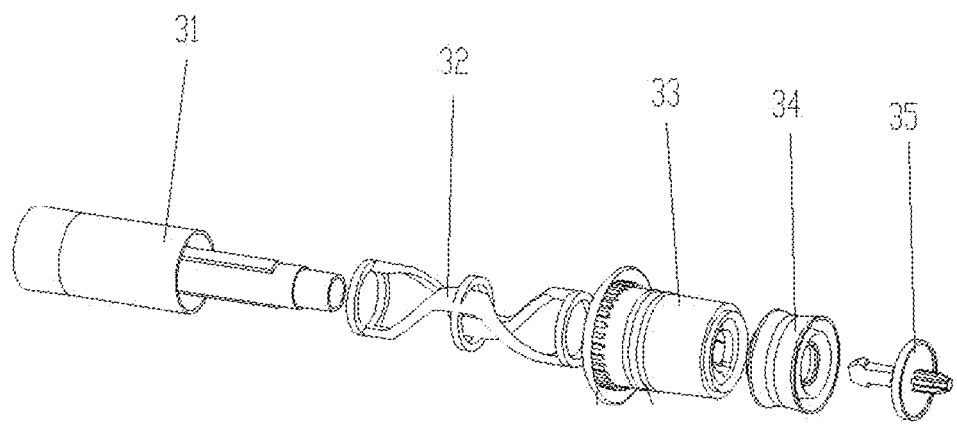
FIG. 20 is an explosion diagram of a pump core according to embodiment 5 of the present disclosure.
Figure 21:
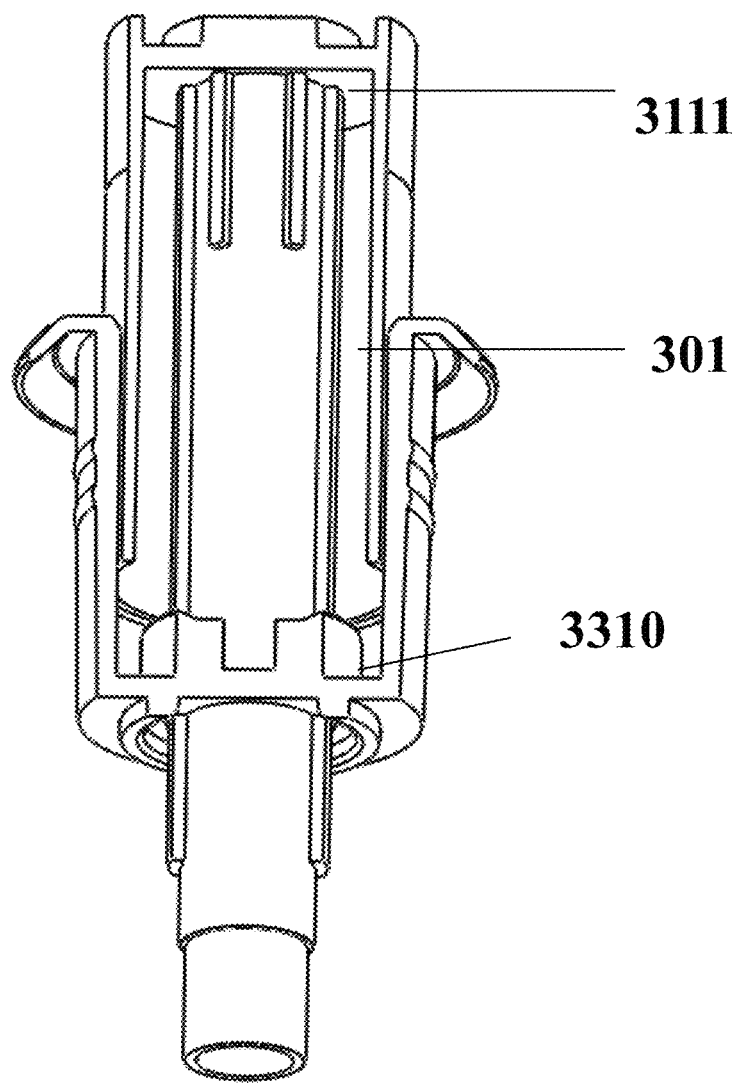
FIG. 21 is a schematic view of a cooperation of a connecting rod with a switch, with a part cut off, according to embodiment 5 of the present disclosure.

Now reference is made to FIGS. 19 to 21. This embodiment provides a pump core 3 which includes a connecting rod 31, a stopper, a plastic spring 32, a piston 34 and a lower valve 35. The stopper 33 in this embodiment is a switch 33. The switch 33 is arranged on the connecting rod 31, and the switch 33 and the connecting rod 31 cooperate with each other to form a cavity 301 for accommodating the plastic spring 32. The plastic spring 32 is arranged between the switch 33 and the connecting rod 31, and the piston 34 is arranged at a lower end of the connecting rod 31, and can move up and down along a lower end of the connecting rod 31 for a small distance. The connecting rod 31 can rotate at a certain angle around an axis relative to the switch 33. The lower valve 35 is fixedly connected with the connecting rod 31. Paired limiting bars and limiting steps can be provided in the connecting rod 31 and the switch to lock the pump core. Symmetrical limiting bars and slots are respectively provided in the connecting rod 31 and the switch, so that the connecting rod can move up and down along an axial direction and achieve the pumping function.

The first mating surface of the plastic spring 32 is in abutted contact with a top surface 3111 above a gap formed by an annular skirt of the connecting rod 31, and the second mating surface of the plastic spring 32 is in abutted contact with an end surface 3310 of a boss inside the switch 33.

Figure 22:
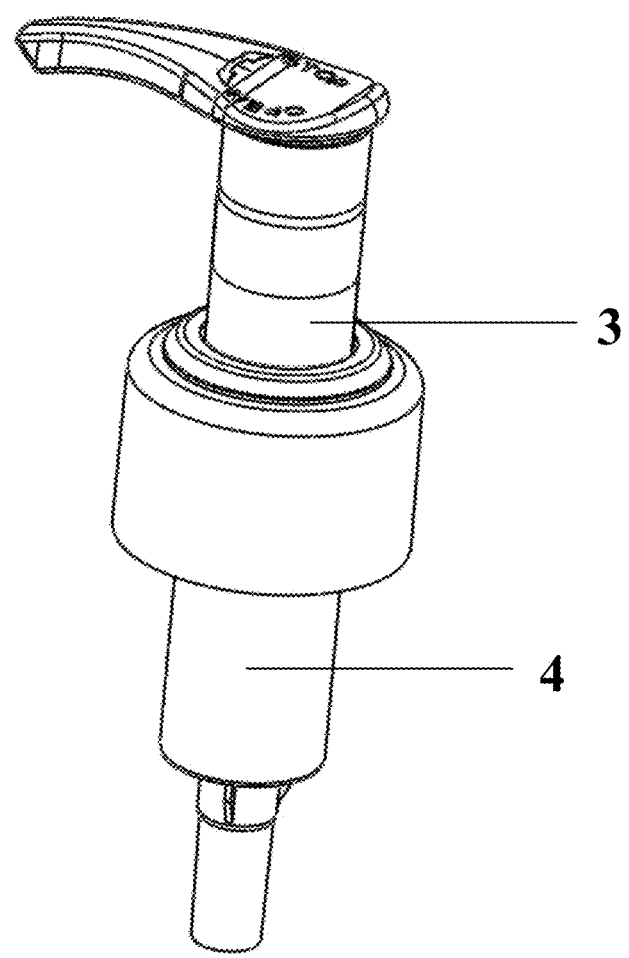
FIG. 22 is a schematic view of a lotion pump according to embodiment 5 of the present disclosure.

Referring to FIG. 22, this embodiment also provides a lotion pump which includes a pump body 4 and a pump core 3. The pump core is arranged in the pump body, and a side wall of the piston 34 is in interference fit with an inner wall of the pump body.

It should be understood by those skilled in the art that in the disclosure of the present invention, the orientation or positional relationship indicated by the terms "upper", "lower", "front", "rear", "left", "right", "vertical", "horizontal", "top", "bottom", "inner", "inner" and the like is based on the orientation or positional relationship shown in the drawings, which is only for the convenience of describing the invention and simplifying the description, but does not indicate or imply that the referred device or element must have a specific orientation, be constructed and operated in a specific orientation, and thus the above terms cannot be understood as limiting the invention.

Although the present disclosure has been disclosed in the preferred embodiment in the above, it is not intended to limit the disclosure and any person familiar with the art can make some changes and embellishments without departing from the spirit and scope of the utility model; therefore, the scope of protection of the disclosure should be subject to the scope of protection as claimed in the claims.

The invention claimed is:

1. A plastic spring, comprising at least one spring unit, each spring unit comprising:
    a first support member;
    a second support member, the first support member being the same as the second support member in shape; and
    at least two torsion arms arranged between the first support member and the second support member, both ends of each of the torsion arms being respectively connected with the first support member and the second support member;
    wherein each of the torsion arms comprises at least one vertical section, and an end of each vertical section is connected with the first support member or the second support member, effectively preventing joints between the torsion arms and the first and second support members from breaking,
    wherein a sum of heights of the vertical section of each torsion arm accounts for less than ½ of a height of the whole torsion arm,
    wherein the inner side surface of each torsion arm is a circular arc surface with a central angle ranging from 120 degrees to 180 degrees, and a central angle corresponding to the inner side surface of each of connecting sections ranges from 45 degrees to 90 degrees.

2. The plastic spring according to claim 1, wherein each of the torsion arms comprises two vertical sections and a connecting section connecting the two vertical sections, and two ends of the connecting section are respectively connected with the first support member or the second support member through two vertical sections.

3. The plastic spring according to claim 2, wherein the first support member has a first mating surface and the second support member has a second mating surface, wherein the vertical section connected with the first support member is perpendicular to the first mating surface, and the vertical section connected with the second support member is perpendicular to the second mating surface.

4. The plastic spring according to claim 3, wherein a shape of a cross section of each of the torsion arms is any one of a polygon, a circle, an ellipse, a closed figure enclosed by one or more arcs and one or more straight lines, or a closed figure enclosed by multiple arcs.

5. The plastic spring according to claim 4, wherein outer side surfaces of all of the torsion arms define a first surface, and inner side surfaces of all of the torsion arms define a second surface.

6. The plastic spring according to claim 5, wherein a side surface of each of the vertical sections further comprises a first inclined surface and a second inclined surface, the first inclined surface and the second inclined surface are opposite to each other, and the first inclined surface, an outer side surface of the vertical section, the second inclined surface and an inner side surface of the vertical section are sequentially connected directly or through a transitional arc surface.

7. The plastic spring according to claim 6, wherein the first surface and the second surface are surfaces of revolution, and the first inclined surface is parallel to the second inclined surface.

8. The plastic spring according to claim 7, wherein an angle between the first inclined surface and the inner side surface of the vertical section is a first acute angle, an angle between the second inclined surface and the inner side surface of the vertical section is a first obtuse angle, an angle between the first inclined surface and the outer side surface of the vertical section is a second obtuse angle, and an angle between the second inclined surface and the outer side surface of the vertical section is a second acute angle.

9. The plastic spring according to claim 8, wherein the first acute angle is smaller than the second acute angle, and the first obtuse angle is equal to the second obtuse angle.

10. The plastic spring according to claim 6, wherein vertical section connected with the second support member further comprises a third inclined surface, the third inclined surface is connected with the first surface and the second inclined surface respectively, an included angle between the third inclined surface and the outer side surface of the vertical section is a third obtuse angle, a height of the third inclined surface is smaller than that of the first inclined surface.

11. The plastic spring according to claim 7, wherein the at least two torsion arms are rotationally symmetrical relative to a rotation axis of the first surface or a rotation axis of the second surface.

12. The plastic spring according to claim 6, wherein the side surface of each of the torsion arms further comprises a first inclined side surface and a second inclined side surface, the first inclined side surface and the second inclined side surface are opposite to each other, wherein the first inclined surface is in the first inclined side surface and the second inclined surface is in the second inclined side surface, a connecting line between the first inclined side surface and the inner side surface of the torsion arm is a first connecting line, and an included angle between a part of the first connecting line on the vertical section and a part of the first connecting line on the connecting section is a fourth obtuse angle.

13. The plastic spring according to claim 12, wherein the fourth obtuse angle ranges from 120 to 179 degrees.

14. The plastic spring according to claim 1, wherein the vertical section and the connecting section are connected through an arc section.

* * * * *